United States Patent [19]

Hoffmockel et al.

[11] Patent Number: 5,608,030

[45] Date of Patent: Mar. 4, 1997

[54] PROCESS FOR THE PREPARATION OF POLYACETALS

[75] Inventors: Michael Hoffmockel, Niedernhausen; Karl-Friedrich Mück, Wiesbaden; Helmut Schlaf, Kelkheim; Karlheinz Burg, Wiesbaden, all of Germany

[73] Assignee: Hoechst Aktiengesellschaft, Germany

[21] Appl. No.: 290,377

[22] Filed: Aug. 15, 1994

[30] Foreign Application Priority Data

Aug. 13, 1993 [DE] Germany .......................... 43 27 245.2

[51] Int. Cl.⁶ .................................................. C08G 63/78
[52] U.S. Cl. .................... 528/232; 528/233; 528/234; 528/239; 528/242; 528/243; 528/248; 528/270; 528/480; 528/481; 528/502 R; 528/503; 522/3; 522/6; 522/64; 522/66; 524/706; 524/765; 524/767; 524/81; 524/401
[58] Field of Search .................................. 528/232, 270, 528/480, 481, 502, 503, 233, 234, 239, 242, 243, 248; 522/3, 6, 64, 66; 524/706, 765, 767, 81

[56] References Cited

U.S. PATENT DOCUMENTS 4,431,794  2/1984  Sadlowski et al. ...................... 528/232

Primary Examiner—Samuel A. Acquah
Attorney, Agent, or Firm—Connolly & Hutz

[57] ABSTRACT

Process for continuous preparation of homo- and copolyoxymethylenes with stable end groups in a homogeneous phase, in which in a tubular reactor with static mixing elements cyclic formaldehyde oligomers are polymerized in the presence of protonic acids as initiators in amounts of 0.005 to 500 ppm in a polymerization zone, in which the residence time of the reaction components in this zone is 0.1 to 10 min and in which the initiator is deactivated immediately after polymerization, there being a fluid transition between the polymerization and deactivator zones which is determined solely by the addition of deactivator, and in which, besides deactivation, stabilization of the chain ends is carried out in the presence of residual monomers, with the volatile constituents being removed from the reaction mixture in a subsequent vent unit. Stabilization is carried out in the presence of alkaline substances, either at temperatures of 150° C. to 250° C., if necessary in the presence of water or primary alcohols, or at 175° C. to 250° C. in the absence of these additives.

14 Claims, No Drawings

PROCESS FOR THE PREPARATION OF POLYACETALS

The invention relates to a process for the preparation and end-group stabilization of polyacetals in a homogeneous phase.

Numerous processes are known for the preparation of oxymethylene homo- and oxymethylene copolymers from formaldehyde or cyclic oligomers of formaldehyde, particularly trioxane, in the presence of cationic initiators. The continuous polymerization of monomers on an industrial scale has for example been described in many publications (U.S. Pat. No. 3,027,352, U.S. Pat. No. 3,803,094, DE-C-1 161 421, DE-C-1 495 228, DE-C-1 720 358 and DE-C-3 018 898). The polymerization reactors described include: kneaders, extruders, rolls or belts. A feature common to all these processes is a phase change during polymerization from a gaseous or liquid monomer to a partially crystalline, solid polymer. Removal of the heat of polymerization and crystallization thereby liberated is often possible only by partially evaporating the monomers and thus incurring conversion losses.

In European Patent EP-B-0 080 656, a process is described for the continuous bulk polymerization of trioxane in a homogeneous, liquid phase at temperatures above 135° C. The advantages claimed for this process include: straightforward operation, low energy consumption and polymers of consistent quality.

In subsequent development work on the known process, however, it has been found that secondary reactions occur to an increased extent during polymerization and that these favour the formation of undesirable end groups on the polymer chains.

Among other effects, these end groups lower the thermal stability of the polymers produced and in this way influence the processing and service properties of the products.

Accordingly, the object was to avoid the above-mentioned disadvantages.

The invention thus relates to a process for continuous preparation of homo- and copolyoxymethylenes with stable end groups in a homogeneous phase, in which in a tubular reactor with static mixing elements cyclic formaldehyde oligomers are polymerized in the presence of protonic acids as initiators in amounts of 0.005 to 500 ppm, preferably 0.01 to 50 ppm and in particular 0.01 to 5 ppm, in a polymerization zone, in which the residence time of the reaction components in this zone is 0.1 to 10, preferably 0.3 to 5 and in particular 0.5 to 2 min, in which the initiator is deactivated immediately after polymerization, there being a fluid transition between the polymerization and deactivator zones which is determined solely by the addition of deactivator, and in which, besides deactivation, stabilization of the chain ends is carried out in the presence of residual monomers, with the volatile constituents being removed from the reaction mixture in a subsequent vent unit.

Through the process according to the invention, it is possible both largely to suppress formation of destabilizing end groups by process control and also to remove or cap the residual undesirable end groups by a process taking place after polymerization.

The preferred oligomer for homo- and copolymerization according to the invention is trioxane. It is crucial for the successful completion of the process that the necessary hydrolytic chain end degradation or chain end capping follows immediately after polymerization and takes place in the presence of residual monomers, ie unconverted monomers.

Suitable comonomers for the polymerization of, e.g. trioxane, are cyclic acetals such as dioxolane, di- or triethylene glycol formal, butanediol formal or linear polyacetals, e.g. polydioxolane or polyethylene glycol formal. The amounts of comonomers or their blends are 0.5 to 50% (w/w), preferably 1 to 30% (w/w) and in particular 2 to 10% (w/w). The comonomer may be added either in a mixture with the main monomer or in the form of a reactive prepolymer. It is equally feasible to feed the comonomer or comonomers into the polymer melt after homopolymerization of the main monomer has been completed. The comonomer or comonomers are then incorporated randomly into the polymer chain by transacetalization reactions. The required residence time for this reaction is in the region of 0.1 to 10 min, preferably 0.3 to 5 min and in particular 0.5 to 2 min.

The use of bifunctional comonomers leads to partially crosslinkedor branched products.

Suitable initiators are protonic acids such as perchloric acid, perfluoroalkanesulphonic acids, preferably trifluoromethanesulphonic acid and its anhydrides as well as heteropoly acids or isopoly acids (EP-B-O 325 052 and EP-B-O 347 119). Particular advantage is gained by using heteropoly acids with phosphorus as the hetero atom. The most suitable is atophosphotungstic acid $H_3[P(W_3O_{10})_4]$.

Through the use of cationic initiators with large anions, such as are possessed by the hetero- and isopoly acids, undesirable secondary reactions can be suppressed.

The initiators can be used in amounts of 0.005 to 500 ppm. The preferred range is 0.01 to 50 ppm, in particular 0.01 to 5 ppm. Since the initiator concentration has a strong influence on molecular weight, it is advisable to add the initiator in dissolved, dilute form. In general, all compounds not affecting polymerization can be used as solvents; preferred compounds are cyclic and linear ethers such as oligoglycoldialkyl ethers or their blends with aliphatic or cycloaliphatic hydrocarbons, eg cyclohexane; surprisingly, lactones such as butyrolactone are suitable also.

The molecular weights of the polymers can be adjusted to the required values in the known manner by using regulators. For the chain transfer agents, formals of monohydric alcohols such as methylal or butyral are the first choice. The alcohols themselves which form the basis of these compounds or water are less suitable as regulators because they lead to formation of unstable chain ends during chain transfer. The amounts normally used are 10 to 5000 ppm and the preferred concentration is 50 to 1000 ppm. The regulator can be added in the known manner by mixing with the monomers. It is also possible to add the substances serving as regulators together with the initiator in the same solution or separately.

All machinery units which ensure rapid homogeneous mixing of monomers and initiator solution, overcome the viscosity increase which takes place during polymerization without loss of efficiency and guarantee homogeneous incorporation of deactivators, stabilizers and additives may be considered as polymerization reactors. Of the machinery which could be used, such as kneaders, extruders, stirred tanks or tubular reactors with built-in elements, tubular reactors fitted with static mixers are preferred on account of the narrow residence time spectrum for the polymer melt. Unlike in EP-B-O 080 656, the process is carried out in equipment which has no built-in separating elements in the form of constrictions, e.g. before the feed point for the deactivator. Increase in the local flow rate of the melt between the individual reaction zones is thus unnecessary.

The polymerization reactor is designed to be temperature-controlled and pressure-resistant. Through the establishment of temperature control zones, the reactor can be given a specified temperature profile. Along the length of the reactor, there are measuring points for pressure and temperature and feed points for monomers, initiator, deactivator and other additives. The temperatures and pressures used in the polymerization correspond to the usual values known in practice, as described, for example, in EP-B-O 080 656 to which reference is made here.

For each of the processing steps quoted, the dimensions, ie diameter and length, of the appropriate static mixing elements have to be selected according to viscosity and residence time with pressure drop being kept as low as possible. Assistance can be sought here from the data issued by the manufacturers of such mixing elements.

A tubular reactor, for example, must be designed to provide a narrow residence time spectrum to facilitate an equilibrium reaction in which, as a result of the minimized residence time, few secondary reactions can take place.

A suitable device is described in German patent application P 43 27 246.0 filed on Aug. 15, 1993 and entitled "Device for the continuous preparation of polyacetals and its use", which corresponds to U.S. Ser. No. 08/290,376, which is incorporated herein.

It has been shown that the residence time of the reaction mixture in the polymerization-active state has a crucial influence on the reaction of the monomers and the course of undesirable secondary reactions. The residence time that must be complied with is 0.1 to 10 min, preferably 0.3 to 5 min and in particular 0.5 to 2 min. The conversion thereby achieved is 60 to 80% (w/w) based on the monomers used. The molecular weights ($M_W$) of the polyacetals produced are, without the use of regulators, in the region of 50 000 to 300 000 (GPC against a polystyrene standard).

To deactivate the initiator in the polymer melt, basic compounds are used, eg salts such as soda or disodium hydrogen phosphate and aliphatic or aromatic primary, secondary or tertiary amines, with preference being given to highly volatile tertiary amines.

It has surprisingly been discovered that the basic salts or amines used as deactivators are also able chemically to degrade unstable chain ends. A special advantage is the presence of unreacted monomers, which assume the function of a solvent and transport agent for improved diffusion. The thermal stability of the polyacetal copolymers so treated is equivalent to that of products treated by solvent hydrolysis. The products obtained have very good colour values and are speck-free.

The concentrations of the alkaline agents vary from 0.001 to 3.0% (w/w) relative to the amount of polymer, with the range from 0.02 to 2.0% (w/w) and in particular from 0.05 to 1.0% (w/w) being preferred.

The temperature to be used in the second processing step in the deactivator zone is from 150° C. to 250° C., preferably 170° C. to 200° C. In the lower temperature range, it is possible if necessary to add small amounts of water or primary alcohols with up to 3 C atoms in the alkyl radical in amounts ranging from 0.5 to 5% (w/w) based on the amount of polymer, as a result of which the activity of the end-group-degrading agents is increased and the required contact time is shortened. In this respect the efficiency of water is significantly greater than that of primary alcohols. A modification of the process consists in the fact that the temperature range is 175° C. to 250° C., preferably 175° C. to 200° C., and that the process is carried out in the absence of water or primary alcohols. It has proved an advantage from the point of view of the degradation rate to remain 20° to 30° C. above the polymerization temperature. The pressure range to be complied with is 20 to 200 bar, preferably 20 to 50 bar.

The residence time in the deactivator and stabilization zone should be set at 0.2 to 15 min, preferably 1 to 15 min, in particular 2 to 10 min.

The combination of deactivation of the initiator with stabilization, ie chemical degradation of the unstable chain ends of copolymers, can also be used to advantage for the simultaneous deactivation and capping of the chain ends of homopolymers. Through the simultaneous addition of a suitable deactivator and a component which closes the hemiacetal end groups, such as carboxylic acid anhydrides or orthocarboxylic acid esters, the hemiacetal end groups are converted to thermally stable ester or ether groups. In this case too it is a particular advantage for the reaction to take place in the presence of unreacted monomers.

In the subsequent vent section, the volatile constituents, eg unreacted monomers, degradation products, solvents and deactivators, are vaporized by reducing the pressure. When venting is completed, the usual additives are incorporated in a compounding extruder. These include light and heat stabilizers, antioxidants, nucleating agents, pigments, lubricants and fillers such as chalk and glass fibres.

The products so prepared are distinguished from conventional polyacetals by having a unimodal molecular weight distribution. The absence of a low-molecular-weight content leads to products with comparable hardness and rigidity values and increased toughness. The products can be employed in the usual applications, such as automotive engineering, the electrical industry, mechanical engineering, sanitary engineering and plumbing.

EXAMPLES

The monomer mixture consisting of trioxane and dioxolane was prepared in a heated storage vessel (80° C.). The monomer mixture was fed by a metering pump into the head of the polymerization reactor (tubular reactor fitted with static mixing elements). A solution of the initiator was injected into the monomer stream in the reactor head. In the premixing zone, the two mixtures were intimately mixed with each other. Polymerization took place in the following reactor zone. Then the deactivator/capping agent solution was injected into the polymer melt and homogeneously incorporated with static mixing elements. The deactivation/end-group capping took place in the third zone of the reactor, which is designed as a residence time zone. The pressure in the reactor was adjusted by a throttle valve at the reactor outlet. The product was decompressed to atmospheric pressure with this throttle valve and solidified spontaneously. As this happened, most of the residual monomer volatilized.

The temperature of the deactivator zone in the examples in table 1 was generally 155° C.

Examples 1C and 2C are for comparison.

TABLE 1

| Example | Monomers [% w/w] | Initiator [mg/kg] | Residence time in polymerization zone [min] | Deactivator [% w/w] | Residence time in deactivator zone [min] | Final concentration of unstable end groups [% w/w] |
|---|---|---|---|---|---|---|
| 1 | trioxane/dioxolane 97 3 | TMS[1)] 0.2 | 2 | TEA[3)]/monomer[4)] 1.0 20 | 10 | 2.5 |
| 2 | trioxane/dioxolane 97 3 | TMS[1)] 0.2 | 2 | TEA/H$_2$O/monomer 0.1 2 20 | 2 | 0.8 |
| 3 | trioxane/dioxolane 97 3 | TMS[1)] 0.2 | 2 | TEA/H$_2$O/monomer 0.1 2 20 | 5 | 0.4 |
| 4 | trioxane/dioxolane 97 3 | TMS[1)] 0.2 | 2 | TEA/H$_2$O/monomer 0.1 2 — | 5 | 1.5 |
| 5 | trioxane/dioxolane 97 3 | HPT[2)] 1 | 2 | TEA/H$_2$O/monomer 1.0 2 20 | 5 | 0.25 |
| 1C | trioxane/dioxolane 97 3 | TMS 0.2 | 15 | TEA/monomer 1.0 20 | 10 | 3.5 |
| 6 | trioxane 100 | TMS 0.2 | 2 | TEA/AA[5)]/monomer 1 3 20 | 10 | 2.5 |
| 2C | trioxane 100 | TMS 0.2 | 2 | AA/monomer 3 20 | 10 | 12 |

[1)]trifluoromethanesulphonic acid, [2)]hexaphosphotungstic acid, [3)]triethylamine, [4)]trioxane and formaldehyde, [5)]acetic anhydride Table 2 shows the effect of temperature and water content in the deactivator zone. It can be clearly seen from this that higher temperatures in the deactivator zone in the absence of water considerably increase degradation of existing unstable end groups in the raw polymer.

TABLE 2

| Examples | Deactivator | Temperature in the deactivator zone [°C.] | Residence time in the deactivator zone [min] | Final concentration of unstable end groups [%] |
|---|---|---|---|---|
| 7 | 0.3% tri-ethylamine | 155 | 7.5 | 3.9 |
| 8 | | 165 | | 2.1 |
| 9 | | 175 | | 0.7 |
| 10 | | 185 | | 1.1 |
| 11 | 4% water | 155 | 7.5 | 1.0 |
| 12 | 0.3% tri-ethylamine | 165 | | 0.8 |
| 13 | | 175 | | 0.6 |
| 14 | | 185 | | 0.8 |

To determine the unstable end groups, the polyacetal from the tubular reactor is treated in an alkaline methanol-water solution at 170° C. to degrade the unstable chain ends.

The alkaline methanol-water solution is prepared from 400 ml demineralized water, 600 ml methanol and 3.4 ml ammonia solution (25%). 20 to 1000 mg of the polyacetal sample for analysis are weighed into a 150 ml mini-autoclave and 40 ml of the alkaline methanol-water solution are then added. The sample is treated for one hour at 170° C. Then the solution is cooled and filtered. The formaldehyde split off during the treatment is present in the solution and is determined by the lutidine method (T. Nash, Biochem. J., Vol. 55, 416 (1953). It is related to the initial sample weight and is a measure of the unstable chain ends.

We claim:

1. A process for the continuous preparation of polyoxymethylenes, comprising the steps of
    polymerizing cyclic formaldehyde oligomer units in a polymerization zone in an tubular reactor with static mixing elements in the presence of protonic acid initiators, wherein said initiators are present in amounts of 0.005 to 500 ppm, and said formaldehyde oligomers having a residence time in the polymerization zone of from 0.1 to 10 minutes, and
    deactivating the initiator immediately after polymerization by adding a deactivator in a deactivization zone, thereby deactivating the initiator, and stabilizing the chain ends of residual oligomers.

2. The process as claimed in claim 1, further comprising the step of removing volatile constituents from the reaction mixture in a vent unit.

3. The process as claimed in claim 1, wherein the initiator is present in amounts of from 0.01 to 50 ppm and the residence time in the polymerization step is from 0.3 to 5 minutes.

4. The process as claimed in claim 1, wherein copolyoxymethylenes are prepared, said copolyoxymethylenes being stabilized by hydrolytic degradation of the chain ends.

5. The process as claimed in claim 1, wherein a homopolyoxymethylene is prepared, said homopolyoxymethylene being further stabilized by a capping reaction.

6. The process as claimed in claim 1, wherein the initiator is supplied in a dissolved, dilute form.

7. The process as claimed in claim 1, wherein the initiator is a hetero- or isopoly acid.

8. The process as claimed in claim 1, wherein the residence time in the deactivation step is from 0.2 to 10 minutes, and the pressure range is from 20 to 200 bar.

9. The process as claimed in claim 1, wherein basic compounds are present in amounts from 0.001 to 3.0% w/w to deactivate the initiator, based on the amount of polymer.

10. The process as claimed in claim 9, wherein the deactivator is a soda, disodium hydrogen phosphate, aliphatic or aromatic primary, secondary, or tertiary amine.

11. The process as claimed in claim 10, wherein the deactivator is volatile tertiary amine.

12. The process as claimed in claim 9, wherein the deactivation step is carried out at temperatures of from 150° to 250° C. and optionally in the presence of water or primary alcohol with up to 3 C atoms in an amount of from 0.5 to 5 % w/w based on the amount of polymer.

13. The process as claimed in claim 9, wherein the deactivation is carried out at temperatures of from 175° C. to 250° C. in the absence of water or primary alcohols.

14. The process as claimed in claim 2, additionally comprising the step of incorporating additives in the form of stabilizers, nucleating agents, pigments, lubricants and fillers.

* * * * *